W. D. ANDREWS.
Bearings for Band-Pulleys.
No. 156,523. Patented Nov. 3, 1874.
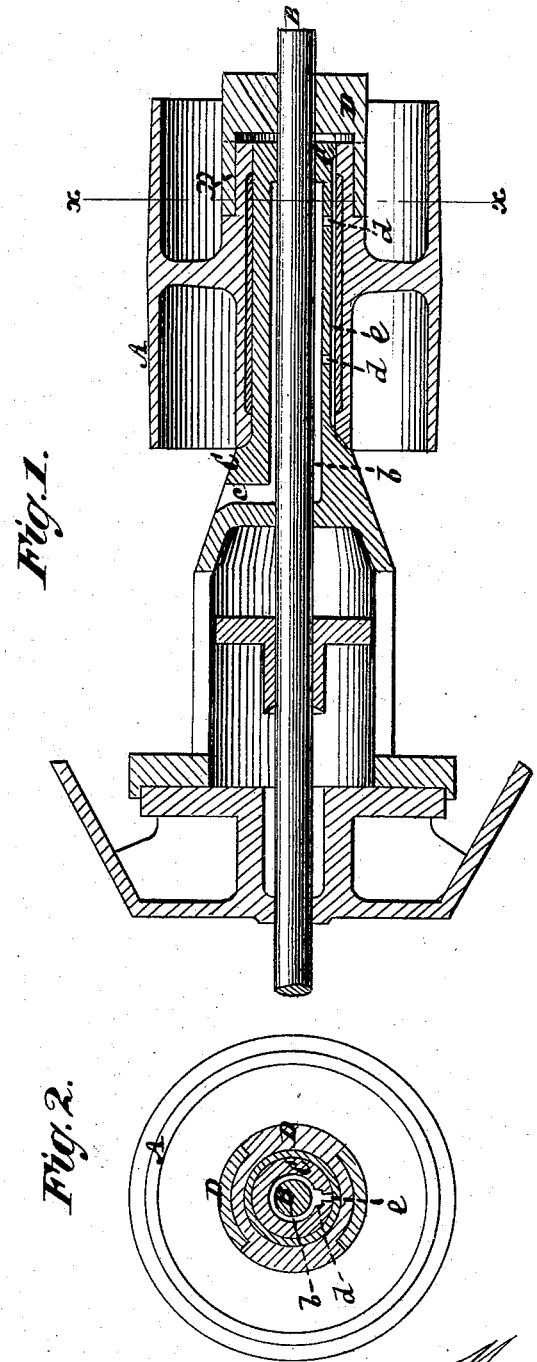

UNITED STATES PATENT OFFICE.

WILLIAM D. ANDREWS, OF BROOKHAVEN, NEW YORK.

IMPROVEMENT IN BEARINGS FOR BAND-PULLEYS.

Specification forming part of Letters Patent No. 156,523, dated November 3, 1874; application filed September 9, 1874.

*To all whom it may concern:*

Be it known that I, WILLIAM D. ANDREWS, of Brookhaven, in the county of Suffolk and State of New York, have invented certain Improvements in Pulleys or Wheels and their Shafts for Transmitting Motion, of which the following is a specification:

This invention, while applicable to various machines and purposes involving the transmission of power by wheels or pulleys, is mainly designed for driving centrifugal pumps or other machines in which any outer bearing for the driving-shaft, other than such as provided in this invention, would interfere, where a driving-pulley is used, with the absolute removal of the belt from said pulley without cutting the belt. To this end, as well as to relieve the shaft from all lateral strain, and only to expose it to torsional strain, the invention consists, in connection with a driving-shaft having a fixed center relatively to the wheel or pulley, in an arrangement of the driving pulley or wheel upon a stationary sleeve or hollow bearing, which receives centrally or longitudinally through it the shaft used to transmit the power by means of a clutch or free coupling connecting the wheel or pulley with the shaft, and said sleeve serving also as a bearing for the shaft. Furthermore, this stationary sleeve or hollow bearing, on which the driving wheel or pulley rotates, it is proposed to construct with an oil-supply recess or passage throughout the main portion of its length, which forms no bearing for the shaft, for operation in connection with apertures in the lower portion of the stationary sleeve, and a longitudinal groove in the under outer side of said sleeve, to effect the lubrication of both the pulley-bearing on the sleeve and the shaft within the latter.

In the accompanying drawing, Figure 1 represents a longitudinal vertical section of my invention as applied to the shaft of a centrifugal pump, and Fig. 2 a transverse section of the same on the line $x\ x$.

A is the pulley, by which motion is communicated to the pump-shaft B. This pulley is arranged to rotate upon a stationary sleeve or hollow bearing, C, through the center of or longitudinally through which the shaft B runs, and said pulley is connected with the shaft B on the outside of or beyond the one end of the sleeve by a free coupling or clutch, D D, the one-half of which is on or connected with the hub of the pulley, and the other half thereof fast to the shaft B. This shaft B has a fixed center relatively to that of the stationary sleeve with which it is concentric.

By this method of applying the power, all lateral strain is taken off the shaft, and only torsional strain transmitted thereto by the pulley, and steady bearings are obtained for the pulley and shaft, the latter having a bearing in the outer end of the stationary sleeve, which on its exterior forms a bearing for the pulley. By the arrangement shown, also, in which the shaft has its bearing in the sleeve, an outer independent bearing for the shaft is dispensed with.

By this construction, provision is made for the absolute removal of the belt, without cutting it, from the driving-pulley, there being no independent outside bearing of the shaft to interfere therewith.

The same principle of construction may be applied to a line-shaft by making the sleeve a part of a hanger, and power can be applied to or taken from the shaft on one or both sides of each hanger, the same exerting only torsional strain on the shaft.

The recess $b$ in the interior of the stationary sleeve C extends nearly its entire length, and is preferably deeper on its lower side, beneath the shaft B, said recess passing beyond the pulley, at the one end of the sleeve, and there having, or terminating in, a vertical oil-hole or opening, $c$, for supplying oil to the interior of the sleeve. Furthermore, the recess $b$ in the sleeve communicates, by holes $d$ through the bottom of the latter, with a longitudinal groove, $e$, in the outer under side of the stationary sleeve for distributing the oil over the entire surface of the sleeve or stationary hollow bearing within the pulley. In this way a most perfect lubrication of the pulley-bearings, as also of the shaft at its bearings in the sleeve, is effected.

I claim—

1. The combination, with the concentric shaft B, having a fixed center, of the stationary sleeve C, constructed to form an outside bearing for the driving wheel or pulley A, and inside bearing for the shaft, and the clutch or free coupling D, substantially as and for the purposes herein set forth.

2. The stationary sleeve C, having a longitudinal oil recess or passage, $b$, in combination with the supply-opening $c$, the apertures $d$ in the under side of the sleeve, the groove $e$ in the under outer side of the sleeve, the wheel or pulley A, and the shaft B, essentially as shown and described.

WM. D. ANDREWS.

Witnesses:
FRANK PLACE,
WILLIAM D. TUTTLE.